US012762034B2

(12) United States Patent
Dar et al.

(10) Patent No.: US 12,762,034 B2
(45) Date of Patent: Oct. 13, 2026

(54) INPUT/OUTPUT (IO) PERFORMANCE ANOMALY DETECTION SYSTEM AND METHOD

(71) Applicant: EMC IP Holding Company, LLC, Hopkinton, MA (US)

(72) Inventors: Shaul Dar, Petach Tikva (IL); Avitan Gefen, Tel Aviv (IL); David Sydow, Merrimack, NH (US); Anil Kumar Koluguri, Durham, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 908 days.

(21) Appl. No.: 17/726,612

(22) Filed: Apr. 22, 2022

(65) Prior Publication Data

US 2023/0342276 A1 Oct. 26, 2023

(51) Int. Cl.
*G06F 11/34* (2006.01)
*G06F 11/30* (2006.01)

(52) U.S. Cl.
CPC ...... *G06F 11/3409* (2013.01); *G06F 11/3034* (2013.01); *G06F 11/3075* (2013.01); *G06F 11/3447* (2013.01); *G06F 11/3466* (2013.01)

(58) Field of Classification Search
CPC ............. G06F 11/3409; G06F 11/3034; G06F 11/3075; G06F 11/3447; G06F 11/3466; G06F 11/3452; G06F 11/3485
USPC .......................................................... 702/186
See application file for complete search history.

(56) References Cited

U.S. PATENT DOCUMENTS

| | | | | |
|---|---|---|---|---|
| 9,703,664 | B1 * | 7/2017 | Alshawabkeh | G06F 3/067 |
| 9,940,033 | B1 * | 4/2018 | Alshawabkeh | G06F 3/0653 |

* cited by examiner

*Primary Examiner* — Aditya S Bhat
(74) *Attorney, Agent, or Firm* — Brian J. Colandreo; Heath M. Sargeant; Holland & Knight LLP

(57) ABSTRACT

A method, computer program product, and computing system for processing historical input/output (IO) performance data associated with one or more storage objects of a storage system. A smoothing model may be applied on at least a portion of the historical IO performance data to generate forecast IO performance data. The forecast IO performance data may be compared to observed IO performance data to generate one or more performance differentials. A normal IO performance range may be generated based upon, at least in part, the one or more performance differentials. One or more IO performance anomalies may be detected based upon, at least in part, the normal IO performance range.

17 Claims, 6 Drawing Sheets

INPUT/OUTPUT (IO) PERFORMANCE ANOMALY DETECTION SYSTEM AND METHOD

BACKGROUND

Storing and safeguarding electronic content may be beneficial in modern business and elsewhere. Accordingly, various methodologies may be employed to protect and distribute such electronic content.

Whether public or private, data centers are complicated systems requiring expertise to handle them. As the storage market becomes commoditized, AI-driven systems are becoming a critical differentiator. For example, artificial intelligence and machine learning may be used to optimize and automate system behavior, analyze the system interactions with customers and applications, and provide real-time and proactive error detection and self-healing.

Detection of performance anomalies can indicate storage system problems such as hardware or software failures, resource contention, inappropriate configuration, incorrect usage of the system by users or applications, a security concern, or changes in the system workload that, if unresolved, may result in poor storage system performance and/or storage system failure.

SUMMARY OF DISCLOSURE

In one example implementation, a computer-implemented method executed on a computing device may include, but is not limited to, processing historical input/output (IO) performance data associated with one or more storage objects of a storage system. A smoothing model may be applied on at least a portion of the historical IO performance data to generate forecast IO performance data. The forecast IO performance data may be compared to observed IO performance data to generate one or more performance differentials. A normal IO performance range may be generated based upon, at least in part, the one or more performance differentials. One or more IO performance anomalies may be detected based upon, at least in part, the normal IO performance range.

One or more of the following example features may be included. Processing historical IO performance data associated with one or more storage objects of a storage system may include processing historical IO performance data for each IO performance metric of a plurality of IO performance metrics separately. Applying a smoothing model on at least a portion of the historical IO performance data to generate forecast IO performance data may include applying a plurality of smoothing models on the at least a portion of the historical IO performance data; and selecting a highest performing smoothing model from the plurality of smoothing models based upon, at least in part, a predefined accuracy metric. A multiplier value may be defined for the normal IO performance range. Generating a normal IO performance range based upon, at least in part, the one or more performance differentials may be further based upon the multiplier value defined for the normal IO performance range. Detecting one or more IO performance anomalies based upon, at least in part, the normal IO performance range may include determining an amplitude and a duration of one or more IO performance outliers based upon, at least in part, the normal IO performance range; and detecting the one or more IO performance anomalies based upon, at least in part, one or more of the amplitude and the duration of the one or more IO performance outliers. Detecting one or more IO performance anomalies based upon, at least in part, the normal IO performance range may include detecting a sequence of at least a predefined number of IO performance outliers based upon, at least in part, the normal IO performance range.

In another example implementation, a computer program product resides on a computer readable medium that has a plurality of instructions stored on it. When executed by a processor, the instructions cause the processor to perform operations that may include, but are not limited to, processing historical input/output (IO) performance data associated with one or more storage objects of a storage system. A smoothing model may be applied on at least a portion of the historical IO performance data to generate forecast IO performance data. The forecast IO performance data may be compared to observed IO performance data to generate one or more performance differentials. A normal IO performance range may be generated based upon, at least in part, the one or more performance differentials. One or more IO performance anomalies may be detected based upon, at least in part, the normal IO performance range.

One or more of the following example features may be included. Processing historical IO performance data associated with one or more storage objects of a storage system may include processing historical IO performance data for each IO performance metric of a plurality of IO performance metrics separately. Applying a smoothing model on at least a portion of the historical IO performance data to generate forecast IO performance data may include applying a plurality of smoothing models on the at least a portion of the historical IO performance data; and selecting a highest performing smoothing model from the plurality of smoothing models based upon, at least in part, a predefined accuracy metric. A multiplier value may be defined for the normal IO performance range. Generating a normal IO performance range based upon, at least in part, the one or more performance differentials may be further based upon the multiplier value defined for the normal IO performance range. Detecting one or more IO performance anomalies based upon, at least in part, the normal IO performance range may include determining an amplitude and a duration of one or more IO performance outliers based upon, at least in part, the normal IO performance range; and detecting the one or more IO performance anomalies based upon, at least in part, one or more of the amplitude and the duration of the one or more IO performance outliers. Detecting one or more IO performance anomalies based upon, at least in part, the normal IO performance range may include detecting a sequence of at least a predefined number of IO performance outliers based upon, at least in part, the normal IO performance range.

In another example implementation, a computing system includes at least one processor and at least one memory architecture coupled with the at least one processor, wherein the at least one processor is configured to process historical input/output (IO) performance data associated with one or more storage objects of a storage system. The at least one processor may be further configured to apply a smoothing model on at least a portion of the historical IO performance data to generate forecast IO performance data. The at least one processor may be further configured to compare the forecast IO performance data to observed IO performance data to generate one or more performance differentials. The at least one processor may be further configured to generate a normal IO performance range based upon, at least in part, the one or more performance differentials. The at least one processor may be further configured to detect one or more IO performance anomalies based upon, at least in part, the normal IO performance range.

One or more of the following example features may be included. Processing historical IO performance data associated with one or more storage objects of a storage system may include processing historical IO performance data for each IO performance metric of a plurality of IO performance metrics separately. Applying a smoothing model on at least a portion of the historical IO performance data to generate forecast IO performance data may include applying a plurality of smoothing models on the at least a portion of the historical IO performance data; and selecting a highest performing smoothing model from the plurality of smoothing models based upon, at least in part, a predefined accuracy metric. A multiplier value may be defined for the normal IO performance range. Generating a normal IO performance range based upon, at least in part, the one or more performance differentials may be further based upon the multiplier value defined for the normal IO performance range. Detecting one or more IO performance anomalies based upon, at least in part, the normal IO performance range may include determining an amplitude and a duration of one or more IO performance outliers based upon, at least in part, the normal IO performance range; and detecting the one or more IO performance anomalies based upon, at least in part, one or more of the amplitude and the duration of the one or more IO performance outliers. Detecting one or more IO performance anomalies based upon, at least in part, the normal IO performance range may include detecting a sequence of at least a predefined number of IO performance outliers based upon, at least in part, the normal IO performance range.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
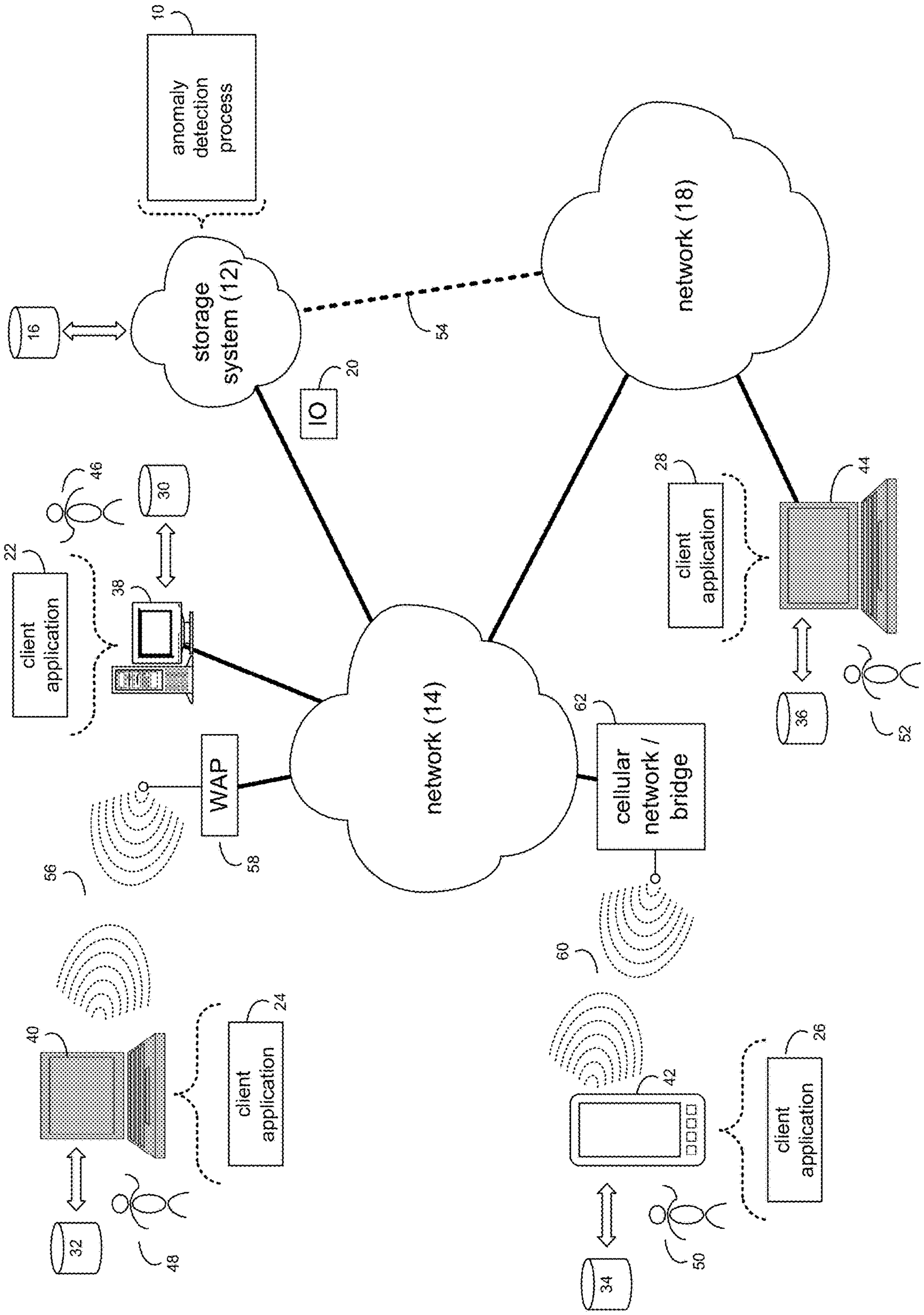
FIG. 1 is an example diagrammatic view of a storage system and an anomaly detection process coupled to a distributed computing network according to one or more example implementations of the disclosure.

System Overview:

Referring to FIG. 1, there is shown anomaly detection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of anomaly detection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of anomaly detection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an anomaly detection process, such as anomaly detection process 10 of FIG. 1, may include but is not limited to, processing historical input/output (IO) performance data associated with one or more storage objects of a storage system. A smoothing model may be applied on at least a portion of the historical IO performance data to generate forecast IO performance data. The forecast IO performance data may be compared to observed IO performance data to generate one or more performance differentials. A normal IO performance range may be generated based upon, at least in part, the one or more performance differentials. One or more IO performance anomalies may be detected based upon, at least in part, the normal IO performance range.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
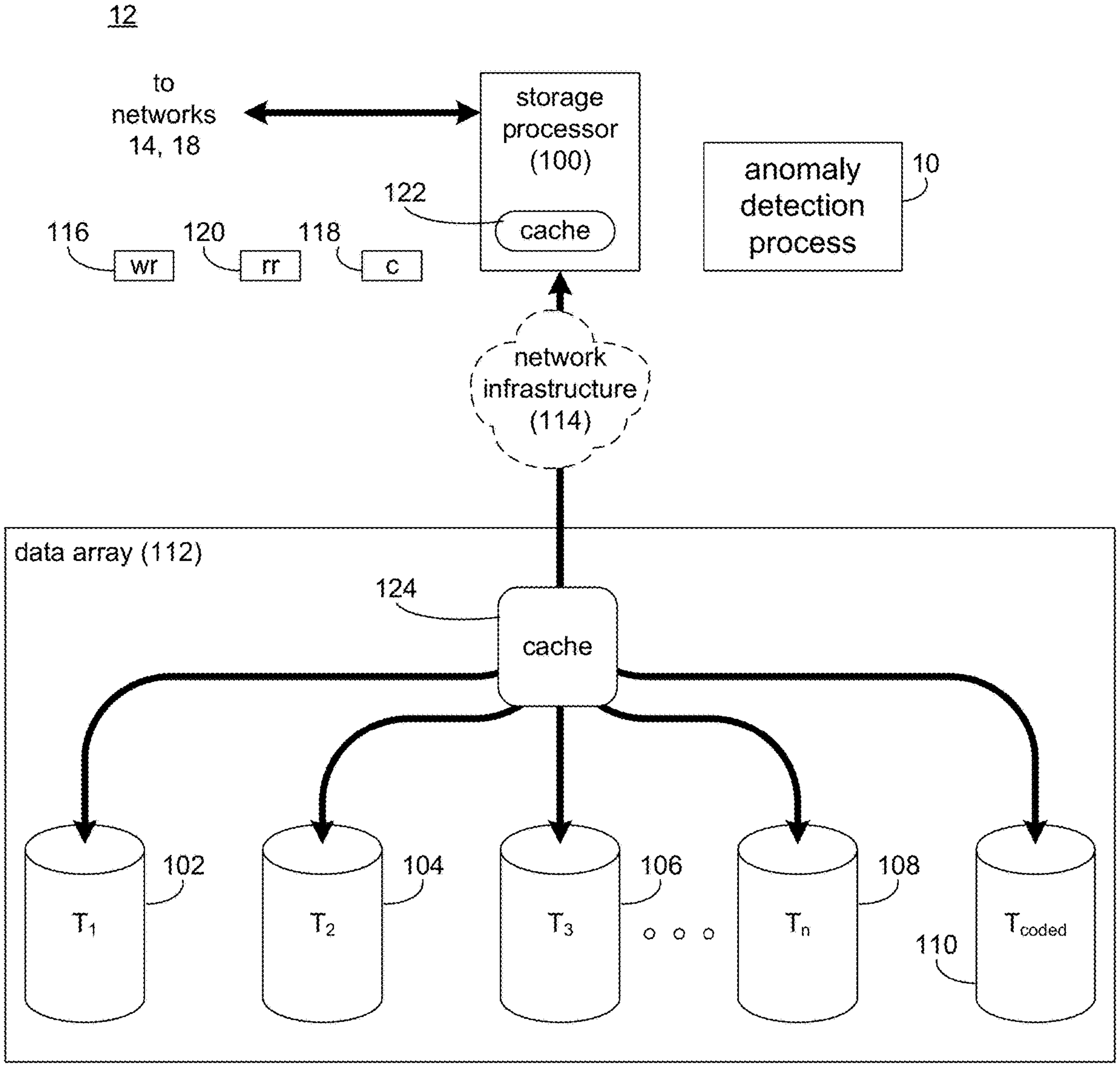
FIG. 2 is an example diagrammatic view of the storage system of FIG. 1 according to one or more example implementations of the disclosure.
Figure 3:
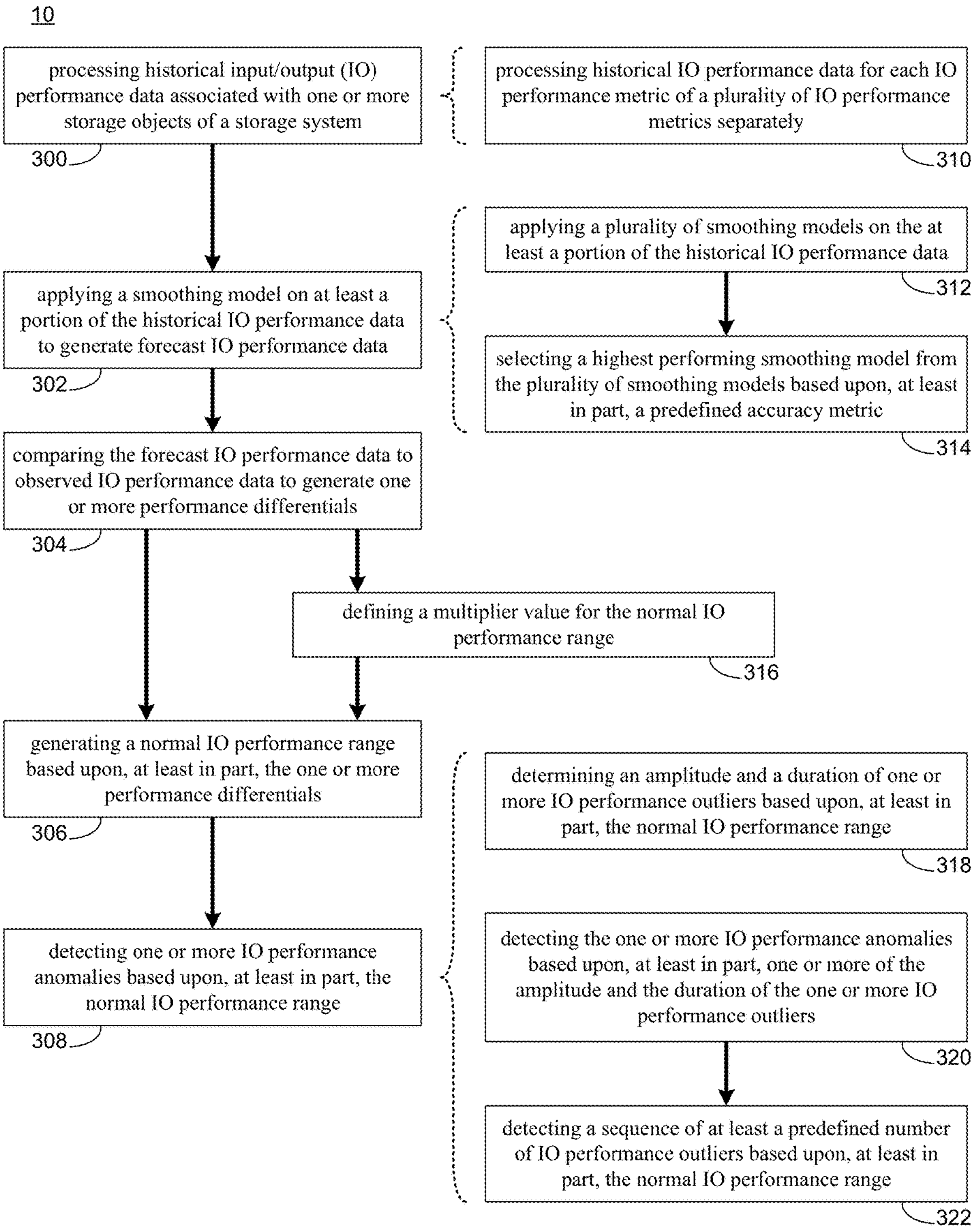
FIG. 3 is an example flowchart of anomaly detection process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of anomaly detection process 10. The instruction sets and subroutines of anomaly detection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of anomaly detection process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of anomaly detection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of anomaly detection process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Anomaly Detection Process:

Referring also to the examples of FIGS. 3-6 and in some implementations, anomaly detection process 10 may process 300 historical input/output (IO) performance data associated with one or more storage objects of a storage system. A smoothing model may be applied 302 on at least a portion of the historical IO performance data to generate forecast IO performance data. The forecast IO performance data may be compared 304 to observed IO performance data to generate one or more performance differentials. A normal IO performance range may be generated 306 based upon, at least in part, the one or more performance differentials. One or more IO performance anomalies may be detected 308 based upon, at least in part, the normal IO performance range.

As discussed above, data centers are complicated systems requiring expertise to handle them. As the storage market becomes commoditized, AI-driven systems are becoming a critical differentiator. For example, artificial intelligence and machine learning may be used to optimize and automate system behavior, analyze the system interactions with customers and applications, and provide real-time and proactive error detection and self-healing.

Detection of performance anomalies can indicate storage system problems such as hardware or software failures, resource contention, inappropriate configuration, incorrect usage of the system by users or applications, a security concern, or changes in the system workload that, if unresolved, may result in poor storage system performance and/or storage system failure. However, it is difficult and impractical to obtain a training set of "labeled" performance traces, known to represent normal vs. a spectrum of abnormal system behavior. As such, conventional approaches to anomaly detection is almost always viewed as an unsupervised machine learning problem (i.e., it is assumed that no labeled data is available). The conventional approach essentially characterizes the normal range of the relevant variable or metric (e.g., IOPs, latency, bandwidth, CPU %, etc.) over a reference historical period. Values that are outside of the normal range are typically assumed to represent potential anomalies for that variable.

However, IO performance on storage systems can exhibit time-related trends and patterns, such as seasonality as well as cyclicality. For example, a new online game can have a growing population of players. A host running bank transactions may be busy during working hours and less busy during off-hours. An accounting application may spring into action on the first day of each month. A shopping web site may become very active during holidays or offer special discounts which may influence customer use, etc. Accordingly, conventional approaches to defining an IO performance anomaly fail to take such trends and patterns into account.

Anomaly detection process 10 may provide a practical and adaptable solution to the above-noted challenges by providing a set of machine learning models that can alert of IO performance anomalies in real-time by analyzing host IO patterns. As will be discussed in greater detail below, the implemented solution may analyze historical IP IO performance data from various time-series metrics to generate a historical seasonal range and detect IO performance anomalies. In this manner, anomaly detection process 10 may improve IO performance anomaly detection for a storage system over conventional systems and may utilize the improved IO performance anomaly detection to perform some remedial action (e.g., generate an alert for a storage administrator; provide recommendations based on the detected IO performance anomaly; and/or automatically adjust storage system properties (e.g., add or remove allocated storage space; throttle particular IO requests at specific points in time; etc.)).

In some implementations, anomaly detection process 10 may process 300 historical input/output (IO) performance data associated with one or more storage objects of a storage system. IO performance data may generally include host IO metrics that represent the IO processing performance for a storage system. Examples of IO performance data may include, but are not limited to, latency, read input/outputs per second (IOPS), write IOPS, total IOPS, and bandwidth. In some implementations, the historical IO performance data may be associated with one or more storage objects of a storage system. Storage objects may generally include any container or storage unit configured to store data within a storage system. For example, a storage objects may be any one of the following: a volume (aka Logical Unit Number (LUN)), a file, or parts thereof that may be defined e.g. by offsets or address ranges (e.g., sub-LUNs, disk extents, and/or slices).

While reference has been made to particular storage objects (i.e., one or more storage objects), the historical IO performance data may be defined for various levels of storage system granularity. For example, anomaly detection process 10 may process 300 historical IO performance data for a collection of storage objects; historical IO performance data for storage objects associated with a particular customer/entity; historical IO performance data for particular storage devices; and/or historical IO performance data for the entire storage system. Historical IO performance data may be stored locally within a particular storage system, may be stored remotely in a network-accessible location, and/or may be stored in a distributed manner across local and/or remote storage devices. In this manner, anomaly detection process 10 may import and/or otherwise access historical IO performance data for processing 300.

Processing 300 historical IO performance data associated with one or more storage objects of a storage system may include processing 310 historical IO performance data for each IO performance metric of a plurality of IO performance metrics separately. For example, anomaly detection process 10 may process 310 the historical time-series data for various performance metrics (e.g., read IOPS, write IOPS, latency, bandwidth, IO request size, etc.) separately for univariate analysis. Accordingly, anomaly detection process 10 may process 310 respective historical IO performance data for one IO performance metric separately from the processing of historical IO performance data from other IO performance metrics. In one example, anomaly detection process 10 may process 310 a predefined amount of historical IO performance data (e.g., the past 30 days) for each of the above metrics. While an example of e.g., 30 days has been described for the predefined amount of historical IO performance data, it will be appreciated that this is for example purposes only and that any amount or period of historical IO performance data may be processed 310 by anomaly detection process 10 within the scope of the present disclosure. For example, the predefined amount of historical IO performance data may be a default amount, a user-defined amount, and/or an automatically determined amount. In some implementations, a minimum amount of historical IO performance data (e.g., at least 48 hours) may be required before processing 310.

In some implementations, anomaly detection process 10 may apply 302 a smoothing model on at least a portion of the historical IO performance data to generate forecast IO performance data. A smoothing model is a time series forecasting machine learning model for univariate data that can be extended to support data with a systematic trend or seasonal component. As is known in the art, a machine learning system or model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the machine learning model is provided feedback that's analogous to rewards, which it tries to maximize. While three examples of machine learning approaches have been provided, it will be appreciated that other machine learning approaches are possible within the scope of the present disclosure.

Applying 302 a smoothing model on at least a portion of the historical IO performance data may include removing fine-grained variation between time steps of the historical IO performance data. Examples of smoothing models may include, but are not limited to, a simple exponential model, a moving average model, a random walk model, and an exponential moving average model. As discussed above, anomaly detection process 10 may apply 302 the smoothing model on historical IO performance data associated with each IO performance metric, separately (e.g., applying a first smoothing model on read IOPS historical IO performance data, applying a second smoothing model on write IOPS performance data, etc.). It will also be appreciated that anomaly detection process 10 may apply smoothing algorithms associated with particular types of data trends. For example, a first smoothing model may be more accurate at forecasting IO performance data for accounting storage systems while a second smoothing model may be more accurate at forecasting IO performance data for ecommerce website. As such, it will be appreciated that anomaly detection process 10 may utilize any number of smoothing models for various storage systems. In some implementations, anomaly detection process 10 may limit the search space of the smoothing model's auto-search in order to mitigate the risk of overfitting to the historical IO performance data.

In some implementations, anomaly detection process 10 may receive a selection of a particular smoothing model as input when detecting IO performance anomalies. For example, anomaly detection process 10 may provide a graphical user interface for receiving a user-selection of a particular smoothing model. In another example, a default smoothing model and/or a default set of smoothing models may be defined for particular IO performance metrics (e.g., one smoothing model for read IOPS, another smoothing model for write IOPS, etc.).

Applying 302 a smoothing model on at least a portion of the historical IO performance data to generate forecast IO performance data may include applying 312 a plurality of smoothing models on the at least a portion of the historical IO performance data; and selecting 314 a highest performing smoothing model from the plurality of smoothing models based upon, at least in part, a predefined accuracy metric. For example, anomaly detection process 10 may access a listing or database of smoothing models to apply to at least a portion of the historical IO performance data. Anomaly detection process 10 may apply 312 some or all of the smoothing models on the historical IO performance data to generate forecast IO performance data associated with each smoothing model. Anomaly detection process 10 may determine the accuracy of the forecast IO performance data associated with each smoothing model. For example, anomaly detection process 10 may utilize a portion of historical IO performance data to test the accuracy of the smoothing model over time. In one example, suppose that Anomaly detection process 10 may utilize a predefined accuracy metric (e.g., a threshold minimum error rate or threshold accuracy metric) to rank the plurality of smoothing models. The predefined accuracy metric may be a default value, a user-defined value, and/or an automatically defined value. Anomaly detection process 10 may select 314 a highest performing smoothing model using the predefined accuracy metric. As discussed above, different smoothing models may be more accurate for different types of IO performance metrics (e.g., read IOPS, write IOPS, latency, etc.). Accordingly, anomaly detection process 10 may select 314 the highest performing smoothing model to generate forecast IO performance data for use in generating a normal IO performance range.

Figure 4:
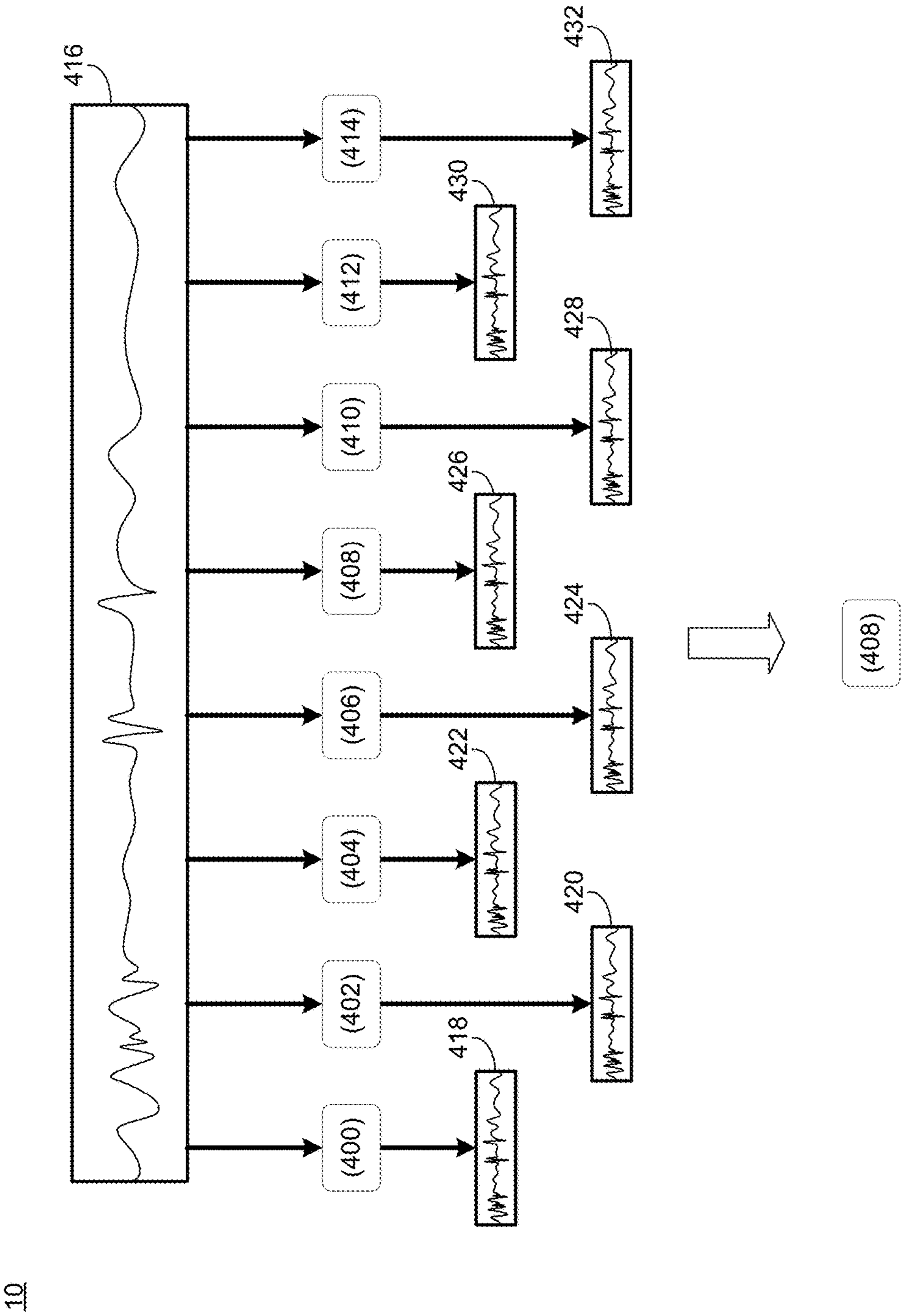
FIG. 4 is a diagrammatic view of various smoothing models being applied to historical IO performance data according to one or more example implementations of the disclosure.

Referring also to FIG. 4 and in some implementations, anomaly detection process 10 may apply 312 a plurality of smoothing models (e.g., smoothing models 400, 402, 404, 406, 408, 410, 412, 414) on at least a portion of the historical IO performance data (e.g., historical IO performance data 416) to generate forecast IO performance data (e.g., forecast IO performance data 418, 420, 422, 424, 426, 428, 430, 432). Anomaly detection process 10 may select 314 a highest performing smoothing model from the plurality of smoothing models (e.g., smoothing models 400, 402, 404, 406, 408, 410, 412, 414) based upon, at least in part, a predefined accuracy metric. In this example, suppose that smoothing model 408 provides the most accurate forecast IO performance data (e.g., forecast IO performance data 426) based upon, at least in part, a predefined accuracy metric. Accordingly, anomaly detection process 10 may select 314 smoothing model 408 from smoothing models 400, 402, 404, 406, 408, 410, 412, 414 for its superior accuracy relative to the other smoothing models.

In some implementations, anomaly detection process 10 may compare 304 the forecast IO performance data to observed IO performance data to generate one or more performance differentials. A performance differential may generally include a difference between the forecast IO performance data and the observed IO performance data. Observed IO performance data may represent newly acquired IO performance data and/or historical IO performance data that is subsequent to the historical IO performance data used by smoothing model. In other words, the observed IO performance data may be utilized to determine the accuracy of the forecast IO performance data. For example, anomaly detection process 10 may utilize the one or more performance differentials to represent the difference between the forecast IO performance data and the observed IO performance data over time. In this manner and as will be discussed in greater detail below, anomaly detection process 10 may define a range of normal IO performance values for a given IO performance metric.

In some implementations, anomaly detection process 10 may define 316 a multiplier value for the normal IO performance range. A multiplier value may generally determine a lower and upper bound for normal IO performance values. In some implementations, there may be various types of multiplier values. In one example, the multiplier value may be the standard deviation of the smoothed series (e.g., the forecast IO performance data). In another example, the multiplier value may be the interquartile range (i.e., the spread difference between the 75th and 25th percentiles of the forecast IO performance data). In some implementations, the multiplier value may be tunable as it controls the width of the seasonal range and the number of anomalies detected. For example, the multiplier value may be a user-defined value (e.g., defined via a slider bar on a graphical user interface) where a smaller multiplier value may limit the lower and upper bounds for normal IO performance range while a larger multiplier value may expand the lower and upper bounds for the normal IO performance range. The multiplier value may be adjusted (e.g., by a storage administrator) to alter the normal IO performance as desired to fit to their environment.

Figure 5:
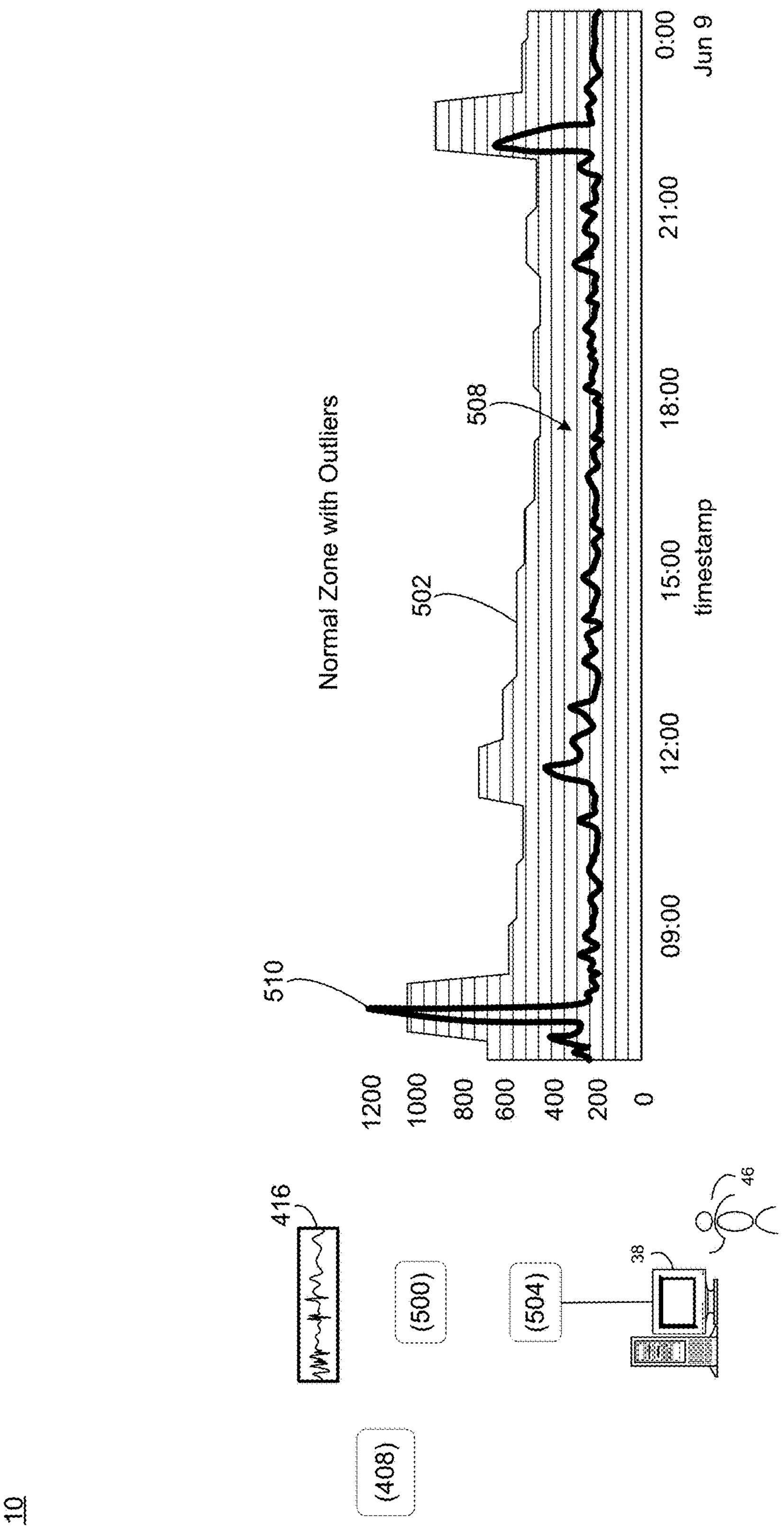
FIG. 5 is an example diagrammatic view of the generation of a normal IO performance range according to one or more example implementations of the disclosure.

In some implementations, anomaly detection process 10 may generate 306 a normal IO performance range based upon, at least in part, the one or more performance differentials. A normal IO performance range may include a range of IO performance values that are regular and not deemed an anomaly. As will be discussed in greater detail below, anomaly detection process 10 may isolate regular patterns in each time series to build a historical seasonal range. Everything outside of the normal IO performance range may be identified as an outlier and, in certain conditions, an anomaly. Referring also to FIG. 5, suppose anomaly detection process 10 may use smoothing model 408 to generate forecast IO performance data. By comparing the forecast IO performance data with observed IO performance data, anomaly detection process 10 may generate one or more performance differentials (e.g., one or more performance differentials 500). With one or more performance differentials 500, anomaly detection process 10 may generate the lower and upper bounds of a normal IO performance range (e.g., normal IO performance range 502). As shown in FIG. 5, normal IO performance range 502 is represented by a shaded region.

Generating 306 a normal IO performance range based upon, at least in part, the one or more performance differentials may be further based upon the multiplier value defined for the normal IO performance range. For example, anomaly detection process 10 may use the multiplier value (e.g., multiplier value 504) and the one or more performance differentials (e.g., one or more performance differentials 500) to generate the lower and upper values for the normal IO performance range. In this example, the multiplier value (e.g., multiplier value 504) may be multiplied with each of the one or more performance differentials (e.g., one or more performance differentials 500) to generate the normal IO performance range (e.g., normal IO performance range 502). If the multiplier value is larger (e.g., greater than one), the normal IO performance range may be expanded, thus reducing the number of potential IO performance outliers. If the multiplier value is smaller (e.g., less than one), the normal IO performance range may be restricted, thus increasing the number of potential IO performance outliers.

In some implementations, anomaly detection process 10 may detect 308 one or more IO performance anomalies based upon, at least in part, the normal IO performance range. An 10 performance anomaly may generally include an irregularity compared to the normal IO performance range. As discussed above, conventional approaches fail to account for time-related trends and patterns, such as seasonality as well as cyclicality. As shown in FIG. 5, the normal IO performance range may represent the time-related trends and patterns of historical IO performance data of a storage system using forecast IO performance data of a smoothing model. In some implementations, anomaly detection process 10 may detect 308 one or more IO performance anomalies from the historical IO performance data. For example, suppose that anomaly detection process 10 generates normal IO performance range 502 for historical IO performance data (e.g., historical IO performance data 508). In this example, anomaly detection process 10 may compare the historical IO performance data (e.g., historical IO performance data 508) to normal IO performance range 502 to detect one or more IO performance outliers or IO performance anomalies.

In another example, anomaly detection process 10 may receive new IO performance data (e.g., in the form of additional IO requests) with the storage system. In this example, IO performance data (e.g., IO performance data 508) may be compared with normal IO performance range 502 to detect one or more IO performance outliers or IO performance anomalies. While examples have been provided for detecting 308 IO performance anomalies from historical IO performance data or from real-time/new IO performance data, it will be appreciated that anomaly detection process 10 may compare any IO performance data with the normal IO performance range to detect 308 one or more IO performance anomalies. As shown in the example of FIG. 5, anomaly detection process 10 may identify an IO performance anomaly (e.g., IO performance anomaly 510) because the IO performance data (e.g., IO performance data 508) includes one or more IO performance values outside of normal IO performance range 502. While FIG. 5 shows a single IO performance anomaly (e.g., IO performance anomaly 510), it will be appreciated that this is for example purposes only and that any number of IO performance anomalies may be detected 308 within the scope of the present disclosure.

As will be discussed in greater detail below, anomaly detection process 10 may detect 308 one or more anomalies by detecting one or more outliers outside the normal IO performance range. However, it will be appreciated that not all IO performance outliers may warrant a remedial action. For example, suppose that a routine maintenance event is intentionally skipped despite the routine maintenance event being accounted for in the historical IO performance data. In this example, the IO performance data may result in an IO performance outlier. However, anomaly detection process 10 may determine whether or not the one or more IO performance outliers are indeed IO performance anomalies using one or more predefined rules or conditions. These rules or conditions may include default rules or conditions, user-defined rules or conditions, or conditions determined by anomaly detection process 10. Additionally, anomaly detection process 10 may determine the severity or potential impact of an IO performance anomaly or combination of IO performance anomalies. For example and as will be discussed in greater detail below, anomaly detection process 10 may utilize an amplitude and a duration of one or more IO performance outliers to determine whether the one or more IO performance outliers are IO performance anomalies. Additionally/alternatively, anomaly detection process 10 may detect a sequence of at least a threshold number of IO performance outliers to determine whether the one or more IO performance outliers are IO performance anomalies. In this manner, anomaly detection process 10 may define a relative severity or impact associated with the one or more IO performance outliers when detecting one or more IO performance anomalies.

Figure 6:
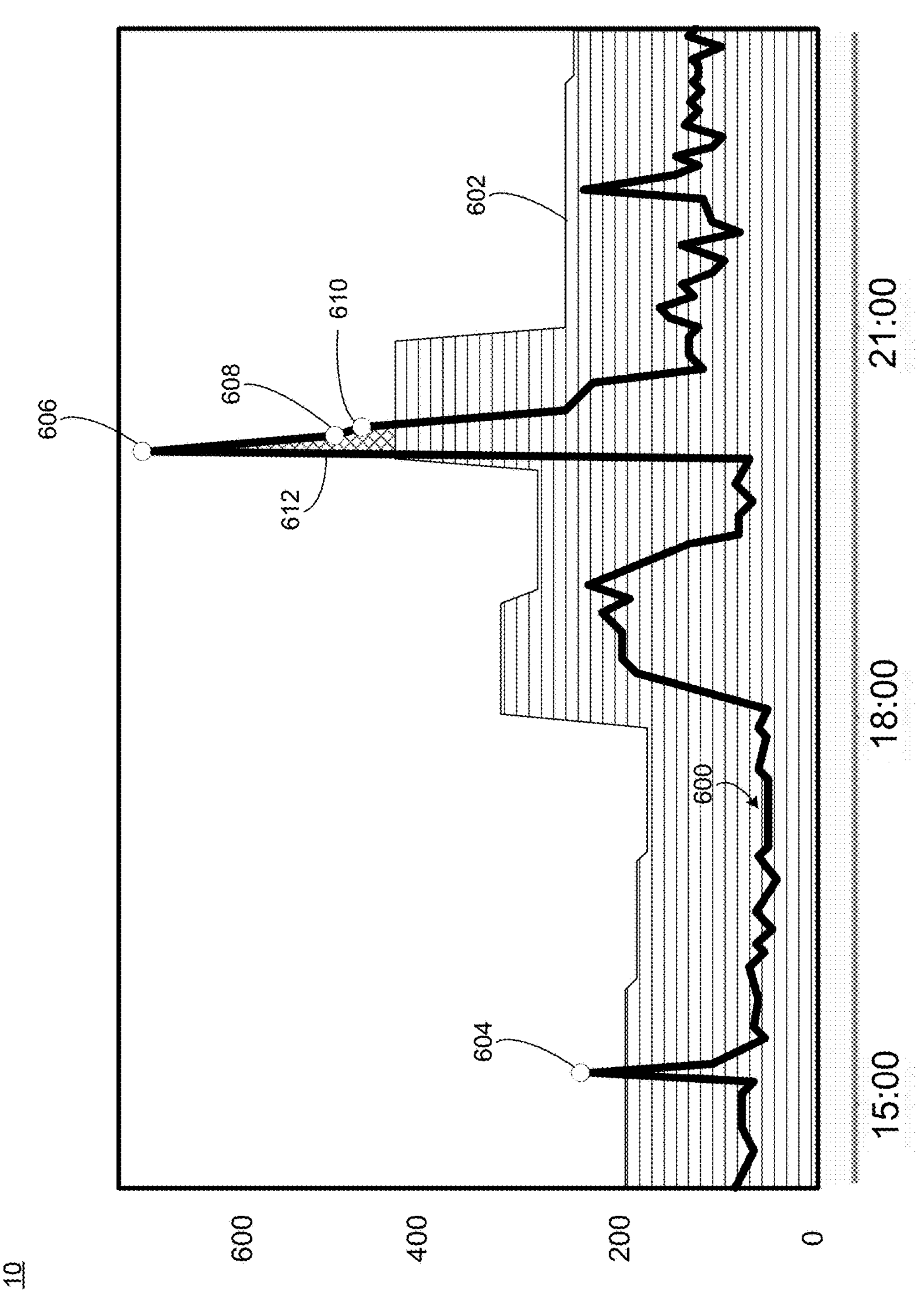
FIG. 6 is an example diagrammatic view of IO performance anomalies according to one or more example implementations of the disclosure.

In some implementations, detecting 308 one or more IO performance anomalies based upon, at least in part, the normal IO performance range may include determining 318 an amplitude and a duration of one or more IO performance outliers based upon, at least in part, the normal IO performance range; and detecting 320 the one or more IO performance anomalies based upon, at least in part, one or more of the amplitude and the duration of the one or more IO performance outliers. Referring also to FIG. 6, consider the sample IO performance data (e.g., IO performance data 600) and normal IO performance range (e.g., normal IO performance range 602). In this example, anomaly detection process 10 may detect e.g., four IO performance outliers (e.g., IO performance outliers 604, 606, 608, 610). In this example, anomaly detection process 10 may determine 318 an amplitude (i.e., the difference between the value of the IO performance outlier and the upper or lower bound of the normal IO performance range) and a duration (i.e., amount of time the IO performance outlier extends outside the normal IO performance range) of the one or more IO performance outliers (e.g., IO performance outliers 604, 606, 608, 610).

Suppose that anomaly detection process 10 determines 318 an amplitude of e.g., 250 read IOPS at IO performance outlier 604 compared to an upper bound of e.g., 200 read IOPS or 250 IOPS−200 IOPS=50 IOPS. Further suppose that the duration is e.g., 5 minutes or 300 seconds. Further suppose that anomaly detection process 10 determines 318 an amplitude of e.g., 700 read IOPS at performance outlier 606; 450 read IOPS at IO performance outlier 608; and 440 read IOPS at performance outlier 610. In this example, anomaly detection process 10 may determine 318 a duration for the combination of IO performance outliers 606, 608, 610 to be 15 minutes or 900 seconds. While an example has been provided with the combination of multiple IO performance outliers, it will be appreciated that anomaly detection process 10 may define a separate duration for each IO performance outlier.

Referring again to the example of FIG. 6, anomaly detection process 10 may determine 318 an amplitude and duration of IO performance outlier 604. In this example, anomaly detection process 10 may define the "impact" of IO performance outlier 604 as the "area" of the IO performance data outside normal IO performance range 602 (i.e., the amplitude multiplied by the duration). As shown in FIG. 6, the area of IO performance anomaly 604 may define a generally triangular-shaped area (i.e., the area under IO performance data 600 outside normal IO performance range 602) with an area of e.g., 50 IOPS*300 seconds/2=7,500. Continuing with this example, anomaly detection process 10 may define the impact of multiple IO performance outliers (e.g., IO performance outliers 606, 608, 610) as the area under IO performance data 600 outside normal IO performance range 602. In the example of FIG. 6, this area may represented by shaded portion 612 and may have a value of e.g., 40,000.

In some implementations, anomaly detection process 10 may define various thresholds for detecting IO performance anomalies. Referring again to the example of FIG. 6, suppose that a threshold area is defined for a low impact; a threshold area is defined for a medium impact; and a threshold area is defined for a high impact. In this example, suppose that the low impact threshold area is defined as e.g., 10,000; the medium impact threshold area is defined as 15,000; and the high impact threshold area is e.g., 20,000. While three examples of impact threshold areas have been defined, it will be appreciated that this is for example purposes only and that any number of impact thresholds may be defined within the scope of the present disclosure. Continuing with the above example, because IO performance outlier 604 has an impact area of e.g., 7,500, anomaly detection process 10 may not detect an IO performance anomaly from IO performance outlier 604. However, because the combination of IO performance outliers 606, 608, 610 has an impact area of e.g., 40,000, anomaly detection process 10 may detect 320 IO performance anomalies from IO performance outliers 606, 608, and 610 based upon, at least in part, the amplitude and the duration of the one or more IO performance outliers (e.g., 606, 608, 610).

Detecting 308 one or more IO performance anomalies based upon, at least in part, the normal IO performance range may include detecting 322 a sequence of at least a predefined number of IO performance outliers based upon, at least in part, the normal IO performance range. For example, anomaly detection process 10 may detect 322 an IO performance anomaly from a sequence of IO performance outliers. A sequence of IO performance outliers may generally include a sequence of contiguous IO performance outliers within a certain time range. In some implementations, a sequence of IO performance outliers may represent a higher impact on the storage system than an individual IO performance outlier. Anomaly detection process 10 may detect 322 an IO performance anomaly from a sequence of IO performance outliers when the sequence includes at least a predefined or threshold number of outliers within a certain time range. For example, the predefined threshold number of outliers and/or the time range may be a default value, a user-defined value, and/or automatically defined by anomaly detection process 10. In some implementations, anomaly detection process 10 may define various impact thresholds for different numbers of IO performance outliers within particular time ranges that define an IO performance anomaly (e.g., three IO performance outliers may constitute a "low" impact sequence; four to six IO performance outliers may constitute a "medium" impact sequence; and seven or more IO performance outliers may constitute a "high" impact sequence). It will be appreciated that any number of sequence thresholds for any time range or ranges may be defined for detecting IO performance anomalies within the scope of the present disclosure.

Returning to the above example of FIG. 6, suppose that anomaly detection process 10 detects 322 a sequence of three IO performance outliers within a certain period of time (e.g., IO performance outliers 606, 608, 610). Now further suppose that a low impact IO performance anomaly is defined as a sequence of three IO performance outliers, a medium impact 10 performance anomaly is defined as a sequence of four to six IO performance outliers; and a high impact IO performance anomaly is defined as a sequence of seven or more IO performance outliers. In this example, anomaly detection process 10 may detect 322 a sequence of at least a predefined number of IO performance outliers (e.g., IO performance outliers 606, 608, 610) based upon, at least in part, the normal IO performance range (e.g., normal IO performance range 602). Accordingly, anomaly detection process 10 may detect a low impact IO performance anomaly.

In some implementations, anomaly detection process 10 may provide a graphical representation of the detected one or more IO performance anomalies as shown in FIGS. 5-6. For example, anomaly detection process 10 may utilize a graphical user interface to display IO performance data (e.g., IO performance data 600), a normal IO performance range (e.g., normal IO performance range 602), and one or more IO performance anomalies (e.g., IO performance anomalies 604, 606, 608, 610). In some implementations, anomaly detection process 10 may provide a user (e.g., user 46) with one or more options to select particular IO performance anomalies (e.g., top "N" IO performance anomalies; top "N" sequences). Additionally, anomaly detection process 10 may allow a user to define particular remedial actions to take based on the detected IO performance anomalies. For example, anomaly detection process 10 may provide a graphical user interface for a user to select remedial actions to take for specific detected IO performance anomalies. For example, anomaly detection process 10 may enable a user to define rules or conditions for taking a remedial action (e.g., generate an alert on a maximum of "N" IO performance anomalies or sequences in some time limit (e.g., five a day)). While an example of e.g., generating an alert has been provided for a remedial action, it will be appreciated that anomaly detection process 10 may perform various types of remedial actions for specific IO performance anomalies and/or sequences of IO performance anomalies.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

processing historical input/output (IO) performance data associated with one or more storage objects of a storage system;

applying a smoothing model on at least a portion of the historical IO performance data to generate forecast IO performance data;

comparing the forecast IO performance data to observed IO performance data to generate one or more performance differentials;

generating a normal IO performance range based upon, at least in part, the one or more performance differentials;

detecting one or more IO performance anomalies based upon, at least in part, the normal IO performance range, wherein detecting one or more IO performance anomalies based upon, at least in part, the normal IO performance range includes:

determining an amplitude and a duration of one or more IO performance outliers based upon, at least in part, the normal IO performance range, and detecting the one or more IO performance anomalies based upon, at least in part, one or more of the amplitude and the duration of the one or more IO performance outliers; and performing a remedial action on the storage system based upon, at least in part, the one or more IO performance anomalies, wherein performing the remedial action includes automatically adjusting allocated storage space for the one or more storage objects based upon, at least in part, the one or more IO performance anomalies.

2. The computer-implemented method of claim 1, wherein processing historical IO performance data associated with one or more storage objects of a storage system includes:

processing historical IO performance data for each IO performance metric of a plurality of IO performance metrics separately.

3. The computer-implemented method of claim 1, wherein applying a smoothing model on at least a portion of the historical IO performance data to generate forecast IO performance data includes:

applying a plurality of smoothing models on the at least a portion of the historical IO performance data; and selecting a highest performing smoothing model from the plurality of smoothing models based upon, at least in part, a predefined accuracy metric.

4. The computer-implemented method of claim 1, further comprising:

defining a multiplier value for the normal IO performance range.

5. The computer-implemented method of claim 4, wherein generating a normal IO performance range based upon, at least in part, the one or more performance differentials is further based upon the multiplier value defined for the normal IO performance range.

6. The computer-implemented method of claim 1, wherein detecting one or more IO performance anomalies based upon, at least in part, the normal IO performance range includes detecting a sequence of at least a predefined number of IO performance outliers based upon, at least in part, the normal IO performance range.

7. A computer program product residing on a non-transitory computer readable medium having a plurality of instructions stored thereon which, when executed by a processor, cause the processor to perform operations comprising:

processing historical input/output (IO) performance data associated with one or more storage objects of a storage system;

applying a smoothing model on at least a portion of the historical IO performance data to generate forecast IO performance data;

comparing the forecast IO performance data to observed IO performance data to generate one or more performance differentials;

generating a normal IO performance range based upon, at least in part, the one or more performance differentials;

detecting one or more IO performance anomalies based upon, at least in part, the normal IO performance range, wherein detecting one or more IO performance anomalies based upon, at least in part, the normal IO performance range includes:

determining an amplitude and a duration of one or more IO performance outliers based upon, at least in part, the normal IO performance range, and detecting the one or more IO performance anomalies based upon, at least in part, one or more of the amplitude and the duration of the one or more IO performance outliers; and performing a remedial action on the storage system based upon, at least in part, the one or more IO performance anomalies, wherein performing the remedial action includes automatically adjusting allocated storage space for the one or more storage objects based upon, at least in part, the one or more IO performance anomalies.

8. The computer program product of claim 7, wherein processing historical IO performance data associated with one or more storage objects of a storage system includes:

processing historical IO performance data for each IO performance metric of a plurality of IO performance metrics separately.

9. The computer program product of claim 7, wherein applying a smoothing model on at least a portion of the historical IO performance data to generate forecast IO performance data includes:

applying a plurality of smoothing models on the at least a portion of the historical IO performance data; and selecting a highest performing smoothing model from the plurality of smoothing models based upon, at least in part, a predefined accuracy metric.

10. The computer program product of claim 7, wherein the operations further comprise:

defining a multiplier value for the normal IO performance range.

11. The computer program product of claim 10, wherein generating a normal IO performance range based upon, at least in part, the one or more performance differentials is further based upon the multiplier value defined for the normal IO performance range.

12. The computer program product of claim 7, wherein detecting one or more IO performance anomalies based upon, at least in part, the normal IO performance range includes detecting a sequence of at least a predefined number of IO performance outliers based upon, at least in part, the normal IO performance range.

13. A computing system comprising:

a memory; and a processor configured to:

process historical input/output (IO) performance data associated with one or more storage objects of a storage system, apply a smoothing model on at least a portion of the historical IO performance data to generate forecast IO performance data, compare the forecast IO performance data to observed IO performance data to generate one or more performance differentials, generate a normal IO performance range based upon, at least in part, the one or more performance differentials, detect one or more IO performance anomalies based upon, at least in part, the normal IO performance range, wherein detecting one or more IO performance anomalies based upon, at least in part, the normal IO performance range includes:

determining an amplitude and a duration of one or more IO performance outliers based upon, at least in part, the normal IO performance range; and detecting the one or more IO performance anomalies based upon, at least in part, one or more of the amplitude and the duration of the one or more IO performance outliers; and perform a remedial action on the storage system based upon, at least in part, the one or more IO performance anomalies, wherein performing the remedial action includes automatically adjusting allocated storage space for the one or more storage objects based upon, at least in part, the one or more IO performance anomalies.

14. The computing system of claim 13, wherein processing historical IO performance data associated with one or more storage objects of a storage system includes:

processing historical IO performance data for each IO performance metric of a plurality of IO performance metrics separately.

15. The computing system of claim 13, wherein applying a smoothing model on at least a portion of the historical IO performance data to generate forecast IO performance data includes:

applying a plurality of smoothing models on the at least a portion of the historical IO performance data; and selecting a highest performing smoothing model from the plurality of smoothing models based upon, at least in part, a predefined accuracy metric.

16. The computing system of claim 13, wherein the processor is further configured to:

define a multiplier value for the normal IO performance range.

17. The computing system of claim 16, wherein generating a normal IO performance range based upon, at least in part, the one or more performance differentials is further based upon the multiplier value defined for the normal IO performance range.

* * * * *